(No Model.)
G. HAYES.
SLAT FOR LOUVERS AND BLINDS.
No. 335,354. Patented Feb. 2, 1886.
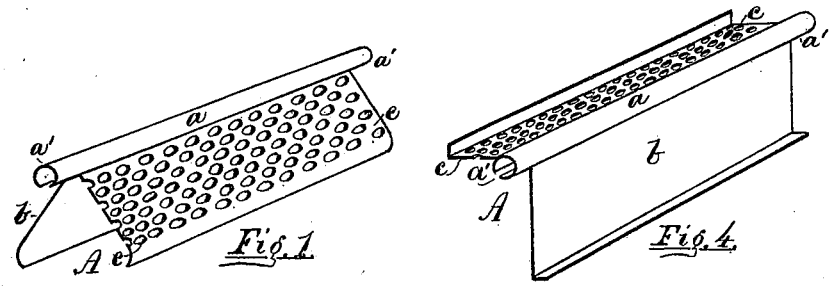
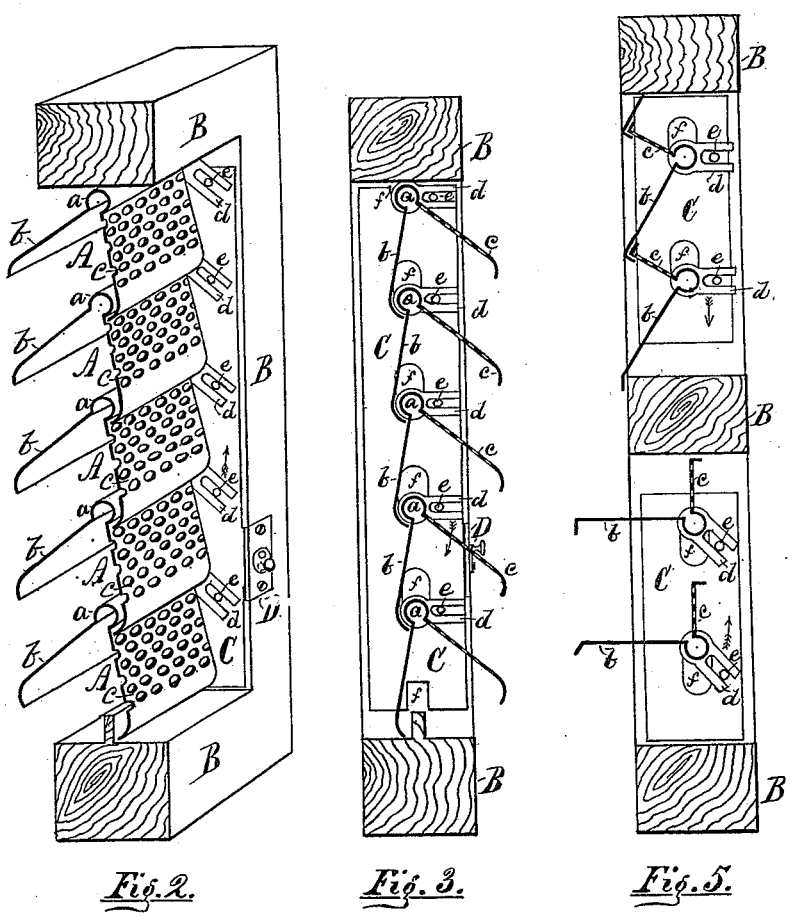
WITNESSES
INVENTOR

UNITED STATES PATENT OFFICE.

GEORGE HAYES, OF NEW YORK, N. Y.

SLAT FOR LOUVERS AND BLINDS.

SPECIFICATION forming part of Letters Patent No. 335,354, dated February 2, 1886.

Application filed July 23, 1885. Serial No. 172,383. (No model.)

*To all whom it may concern:*

Be it known that I, GEORGE HAYES, a resident of the city, county, and State of New York, have invented a new and useful Improvement in Slats for Louvers and Blinds, of which the following is a specification.

My invention consists of a slat for louvers and blinds, (formed preferably of sheet metal,) having a pivot centrally located at each end of the same, adapted for insertion into holes formed to receive said pivots in the "stiles" of blinds or doors, posts of turrets, clearstories, or other suitable supports, and each side of said pivots a flange, plate, or wing—one of said wings apertured by perforations or otherwise to admit passage of light and air, to the exclusion of flies, mosquitoes, and other insects, and the other wing plain, (or without apertures,) to serve as a protector to the apertured wing in excluding the direct rays of the sun, also rain, hail, snow, &c.—the slat adapted to be hung to its supports in such manner that it may be rocked to bring either wing into nearly a vertical position, as desired.

It further consists of a combination of such slats forming a series, arranged in suitable supports, one above the other—as many as desired—constituting a panel adapted to all purposes to which blinds are applicable.

It further consists of a combination of an operating device therewith, whereby the series of slats may be opened or closed simultaneously and securely held in either position required for effective use, as hereinafter described.

In the accompanying drawings, Figure 1 is a perspective view of one slat ready to place in a frame. Fig. 2 is a sectional perspective view of a series of such slats in a frame—as, for instance, a window-blind. In this view the slats are open, so as to admit of ventilation and vision through the apertured flange or wing. Fig. 3 is a vertical section of the same series, the slats shown closed. Fig. 4 shows in perspective a slat modified from the above, the apertured flange or wing located outside the line of pivots and adapted to engage with the lower edge of the plain flange or wing of the slat next above. Fig. 5 is a vertical section, showing series of slats like those in Fig. 4, to illustrate the operation of this modified form. The upper series shows the slats in position to admit air and vision through the apertured flange or wing, and the lower series show the slats entirely open.

The slats of Figs. 1 and 4 both rock on or by means of their pivots, and in both the flanges or wings extend outwardly or away from the line of pivots, but differ in the manner of hanging or adjusting in the frame.

In Figs. 2, 3, and 5 are shown the operating device by which the slats in series are moved simultaneously.

A represents the blind or louver slat, preferably formed of one piece of sheet metal; but it may be formed of pieces joined together, and also of other material. It is formed with a pivot-roll, $a$, in the drawings; but this roll may be dispensed with and a simple bend or angle formed at that point.

At $a'$ are shown the pivots by which the slat is hung to side supports—such as stiles of doors, blinds, &c., or posts of turrets, &c.—suitable holes being provided for the reception of the pivots. The pivots may be formed separately from the slat and attached thereto by suitable means, or formed from the slat by cutting away the portions each side of the pivot-roll or pivot-line sufficiently and curling under the edges to make it circular and enable it to turn easily upon its bearings. The pivots shown are formed in this latter manner.

$b$ is a flange or wing intended to serve as a ray and water-shed. It extends from the pivot line or bend of the slat or from the pivot-roll, as shown.

$c$ is a flange or wing extending in like manner from the pivot-line, &c. This flange or wing is perforated or otherwise provided with apertures to admit of ventilation, and in such manner as to exclude flies, mosquitoes, and other insects. The flange or wing $b$ serves as a protector therefor in excluding the direct rays of the sun and in obviating or preventing the injury which might result, without its presence, from hail, rain, snow, &c. This flange or wing may be so arranged when setting the slats as to protect the ventilating-wing of its own slat or that of the next slat below, the two methods of hanging being shown, respectively, in Figs. 2 and 5.

Through the ventilating-wing view may be had of the exterior surroundings, when near thereto, and ventilation secured.

Both or either of the wings or flanges may be molded into curved or other ornamental forms, as desired, and the outer edges of the wings curved downward, as shown in Figs. 1, 2, and 3, or bent upward or otherwise at an angle, essentially as shown in Figs. 4 and 5, to enable the slats to come into close conjunction. When in series, as shown in Figs. 2, 3, and 5, the slats are moved (or rocked) by a plate sliding upward and downward against the inside of the stile B or other support. The said plate is marked C.

At $d$ is shown a lever attached by any suitable means to the slat or pivot $a'$. Its outer end is shown as forked, but it may be slotted.

At $e$ is shown a lug or projection from plate C, fitting into and operating within the forked end of the lever $d$, so that as the sliding plate C is moved upward or downward the levers will be moved thereby, and the slats rocked open or shut, as desired.

At D is shown a means for handling the sliding plate; but it may be moved without any additional device, or with other device than that shown at D, which, as shown, consists of an eccentric button, and may be sunk into the stile if desired.

What I claim as new, and desire to secure by Letters Patent of the United States, is—

1. A louver or blind slat formed of two portions or wings, $b$ and $c$, one apertured and the other plain, and the slat bent or otherwise shaped centrally to constitute the plain wing $b$, a protector for the apertured wing $c$, and the slat provided with a pivot centrally located at each end, essentially as shown and described.

2. The pivoted and movable louver or blind slat A, formed with pivot-roll $a$, centrally located and extending therefrom, the plain flange $b$ on one side and the apertured flange $c$ on the other side, substantially as shown and described.

3. Two or more pivoted and movable slats in combination, each having a ray and watershed wing, $b$, and apertured wing $c$, and also pivots $a'$, forming a ventilating-panel, substantially as shown and described.

4. In combination with slats A, formed as set forth, the sliding plate C, the arms or levers $d$, attached to pivots $a'$ and adapted to fit over and engage with projections or lugs of plate C, substantially as shown and described.

GEO. HAYES.

Witnesses:
CHARLES HAYES,
JACOB J. KOCH.